(12) United States Patent
Chiba et al.

(10) Patent No.: US 8,522,747 B1
(45) Date of Patent: Sep. 3, 2013

(54) FUEL INJECTION APPARATUS FOR INTERNAL COMBUSTION ENGINE

(75) Inventors: Fumito Chiba, Susono (JP); Mamoru Yoshioka, Susono (JP); Takahiro Tsukagoshi, Susono (JP); Ryota Onoe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/505,613

(22) PCT Filed: Mar. 8, 2010

(86) PCT No.: PCT/JP2010/053768
§ 371 (c)(1),
(2), (4) Date: May 2, 2012

(87) PCT Pub. No.: WO2011/111148
PCT Pub. Date: Sep. 15, 2011

(51) Int. Cl.
*F02M 25/14* (2006.01)
(52) U.S. Cl.
USPC ............ 123/304; 123/1 A; 123/472; 123/575; 239/585.1
(58) Field of Classification Search
USPC .................... 123/1 A, 304, 472, 478, 575; 239/585.1–585.5
See application file for complete search history.

(56) References Cited

U.S. PATENT DOCUMENTS

2008/0092851 A1 4/2008 Arakawa et al.
2012/0266843 A1* 10/2012 Yoshioka et al. ............. 123/304

FOREIGN PATENT DOCUMENTS

| JP | A-2008-88941 | 4/2008 |
| JP | A-2008-106623 | 5/2008 |
| JP | A-2008-248840 | 10/2008 |
| JP | A-2009-36151 | 2/2009 |
| JP | A-2009-281330 | 12/2009 |
| JP | A-2009-293404 | 12/2009 |

OTHER PUBLICATIONS

International Search Report issued in International Application No. PCT/JP2010/053768 dated Apr. 6, 2010 (with translation).

* cited by examiner

*Primary Examiner* — Erick Solis
(74) *Attorney, Agent, or Firm* — Oliff & Berridge, PLC (57) ABSTRACT

The fuel injection apparatus includes: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol. The fuel injection apparatus controls an injection amount from the fuel injector such that an air-fuel ratio of an internal combustion engine is a control target air-fuel ratio based on an alcohol concentration of the blended fuel to be supplied to the fuel injector. In this fuel injection apparatus, a fuel pressure is brought to a predetermined low fuel pressure when a request is issued for desorbing alcohol adsorbed on the adsorbent.

7 Claims, 6 Drawing Sheets

100: Calculate desorption request flag
102: Desorption request flag = ON?
104: Acquire and set fuel pressure required during desorption
106: Acquire alcohol concentration $ROH_{Tank}$
108: Calculate desorbed amount of alcohol
110: Calculate alcohol concentration $ROH_{Inj}$
112: Perform injection amount correction
114: Acquire remaining amount of adsorbed alcohol
116: Remaining amount of adsorbed alcohol < predetermined value A?

Fig. 6

200: Acquire complete combustion determining flag
202: Complete combustion determining flag = ON?
204: Desorption request flag = OFF?
206: Acquire and set fuel pressure required
208: Calculate alcohol concentration $ROH_{Tank}$
210: Calculate desorbed amount of alcohol
212: Calculate alcohol concentration $ROH_{Inj}$
214: Perform injection amount correction

FUEL INJECTION APPARATUS FOR INTERNAL COMBUSTION ENGINE

TECHNICAL FIELD

The present invention relates to a fuel injection apparatus for an internal combustion engine.

BACKGROUND ART

Figure 8:
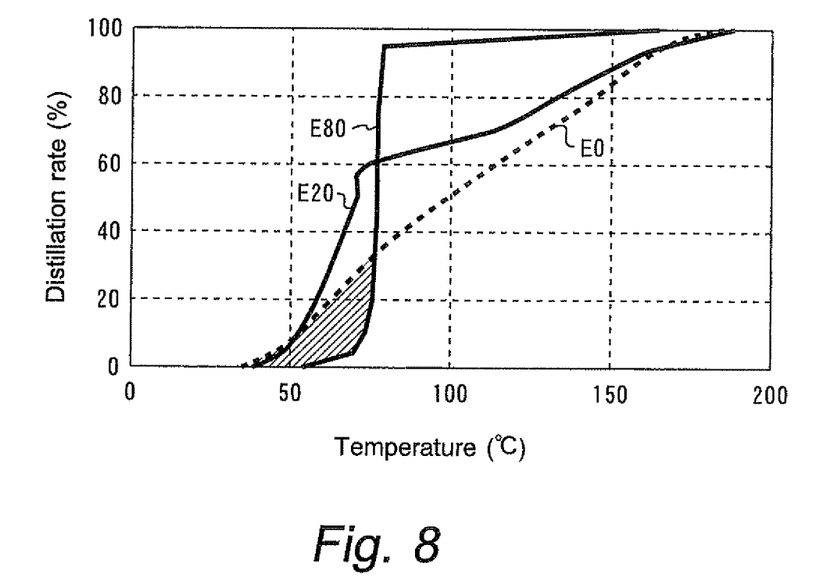
FIG. 8 is a chart showing a relationship between a distillation rate and a temperature of E80, E20, and E0.

A known internal combustion engine can use a blended fuel that is a mixture of gasoline and alcohol such as ethanol or methanol. FIG. 8 is a chart showing a relationship between a distillation rate and a temperature of E80 (a blended fuel with 80% ethanol), E20 (a blended fuel with 20% ethanol), and E0 (100% gasoline). Gasoline is composed of multiple components including one having a low boiling point which contributes to an outstanding vaporization characteristic even at low temperatures. Alcohol, on the other hand, is composed of a single component and thus has a fixed boiling point which is high (about 78° C. for ethanol). As is known from FIG. 8, therefore, a blended fuel having a high concentration of alcohol, such as E80, has a drawback that the fuel is extremely difficult to vaporize at temperatures lower than the boiling point of alcohol. Note that a blended fuel having a relatively low alcohol concentration, such as E20, may actually more readily vaporize than 100% gasoline because of azeotropic phenomenon.

For the reasons as described above, when a blended fuel having a high alcohol concentration is used, substantially only the gasoline component vaporizes of the blended fuel injected from a fuel injector during cold starting of the internal combustion engine, with very little of the alcohol component vaporizing. This results in an insufficient amount of vaporized fuel that contributes to combustion, thus posing a problem of tendency toward poor startability. In addition, the starting relies only on the gasoline component of the blended fuel injected, so that a large amount of fuel needs to be injected at starting in order to compensate for the insufficiency. An amount of alcohol component many times the amount of gasoline component that has contributed to combustion fails to vaporize and burn, flowing past a combustion chamber into an exhaust path in a form of HC. This results in a problem in that the amount of HC discharged into the atmosphere tends to be extremely large during cold starting.

JP-A-2008-248840 discloses an internal combustion engine to which a blended fuel of gasoline and ethanol is supplied, wherein water is added to a fuel tank that accumulates the blended fuel to thereby separate and extract ethanol water from the blended fuel, and alcohol water is allowed to be injected into an intake port during heavy load operation. The internal combustion engine includes: a main tank that communicates with a gasoline injection valve; and a sub-tank that communicates with an ethanol water injection valve. The main tank accumulates residual fuel (gasoline) to which water has been added, and the sub-tank accumulates the separated ethanol water. Being able to inject gasoline or ethanol water at any desired timing, the internal combustion engine can solve the foregoing problem.

PRIOR ART DOCUMENTS

Patent Documents

Patent Document 1: JP-A-2008-248840

SUMMARY OF THE INVENTION

Problem to be Solved by the Invention

The related art technique, however, requires two separate fuel supply systems, each including a fuel injector, a delivery pipe, and a fuel path, one for gasoline injection and the other for alcohol injection. This substantially doubles the cost, weight, and space requirements of the fuel supply systems, leading to a significantly increased cost, aggravated fuel economy due to the increased weight, and aggravated mountability.

The present invention has been made to solve the foregoing problems and it is an object of the present invention to provide a fuel injection apparatus for an Internal combustion engine using a blended fuel of gasoline and alcohol, capable of inhibiting, with a simple structure, emissions from being aggravated during use of the blended fuel.

Means for Solving the Problem

In accomplishing the above object, according to a first aspect of the present invention, there is provided a fuel injection apparatus for an internal combustion engine including: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the fuel injection apparatus controlling an injection amount from the fuel injector such that an air-fuel ratio of the internal combustion engine is a control target air-fuel ratio based on an alcohol concentration (hereinafter referred to as a first alcohol concentration) of the blended fuel to be supplied to the fuel injector, the adsorbent having a characteristic that an adsorbed amount of alcohol is small when a fuel pressure is low and large when the fuel pressure is high, the fuel injection apparatus comprising:

means for determining whether or not there is a request for desorbing alcohol adsorbed onto the adsorbent;

means for bringing the fuel pressure to a predetermined low fuel pressure if it is determined that there is the request;

means for estimating an amount of alcohol to be desorbed from the adsorbent; and means for correcting any deviation in an air-fuel ratio of the internal combustion engine based on the desorbed amount of alcohol.

According to a second aspect of the present invention, there is provided the fuel injection apparatus as described in the first aspect, wherein:

the desorbed amount estimating means estimates the desorbed amount of alcohol based on a fuel pressure and a fuel temperature inside the internal space.

According to a third aspect of the present invention, there is provided the fuel injection apparatus as described in the first or second aspect, wherein:

the correcting means includes means for estimating an alcohol concentration of fuel to be injected from the fuel injector (hereinafter referred to as a second alcohol concentration) based on the desorbed amount of alcohol, and corrects a change in the air-fuel ratio corresponding to an increase in the second alcohol concentration relative to the first alcohol concentration by increasing or decreasing the injection amount.

According to a fourth aspect of the present invention, there is provided the fuel injection apparatus as described in any one of the first to third aspects, wherein:

the determining means includes means for acquiring a coolant temperature of the internal combustion engine and determines that there is the request when the coolant temperature is lower than a predetermined value.

According to a fifth aspect of the present invention, there is provided the fuel injection apparatus as described in any one of the first to fourth aspects, further comprising:

means for bringing the fuel pressure to a first high fuel pressure during cold starting of the internal combustion engine; and means for bringing the fuel pressure to a second high fuel pressure that is lower than the first high fuel pressure and higher than the low fuel pressure if it is determined that there is not the request immediately after starting of the internal combustion engine.

According to a sixth aspect of the present invention, there is provided the fuel injection apparatus as described in the fifth aspect, wherein:

the second high fuel pressure is a value near the first high fuel pressure.

Effects of the Invention

The fuel injector of the present invention includes the adsorbent disposed in the internal space of the leading end portion thereof, the adsorbent being capable of selectively adsorbing the alcohol component in the blended fuel of gasoline and alcohol. The fuel injector of the present invention can therefore reduce the alcohol concentration of the fuel to be injected immediately when necessary (e.g. during cold starting). Since the foregoing effect can be achieved without having a fuel injector for use exclusively for alcohol, the fuel supply system can be simplified for reduction in cost and weight.

In the first aspect of the present invention, if there is a request for desorbing the alcohol adsorbed onto the adsorbent, the fuel pressure is brought to a predetermined low fuel pressure to meet the request. This reduces the amount of alcohol adsorbed on the adsorbent, so that part of the adsorbed alcohol is desorbed. It is to be noted here that the internal combustion engine performs the air-fuel ratio control based on the alcohol concentration (the first alcohol concentration) of the blended fuel supplied to the fuel injector. If the alcohol concentration of the fuel injected from the fuel injector is therefore increased because of the desorbed alcohol involved, the air-fuel ratio of the internal combustion engine deviates from the control target air-fuel ratio. In addition, a change in the alcohol concentration of the blended fuel results in a change in a stoichiometric air-fuel ratio of the blended fuel. In the first aspect of the present invention, the deviation in the air-fuel ratio of the internal combustion engine is corrected based on the amount of alcohol desorbed from the alcohol adsorbent. According to the present invention, therefore, aggravation of emissions arising from the deviation in the air-fuel ratio can be effectively inhibited even if the alcohol component is desorbed from the adsorbent.

In the second aspect of the present invention, the amount of alcohol desorbed from the adsorbent is correlated with the fuel pressure and the fuel temperature in the internal space in which the adsorbent is disposed. According to the present invention, therefore, the desorbed amount of alcohol can be accurately estimated based on these state quantities.

In the third aspect of the present invention, the change in the air-fuel ratio due to an increased second alcohol concentration is corrected by increasing or decreasing the fuel injection amount. According to the present invention, therefore, the air-fuel ratio of the internal combustion engine can be brought to the control target air-fuel ratio even if the alcohol component is desorbed from the adsorbent.

In the fourth aspect of the present invention, when the coolant temperature of the internal combustion engine is higher than a predetermined value, it is determined that there is a request for desorbing the alcohol adsorbed on the adsorbent. When the engine temperature rises, vaporization failure unique to alcohol no longer occurs. According to the present invention, therefore, a situation can be effectively inhibited in which the desorbed alcohol is discharged as an unburned alcohol.

In the fifth aspect of the present invention, the fuel pressure is brought to the first high fuel pressure during cold starting of the internal combustion engine. If there is no request for desorption after starting, the fuel pressure is brought to the second high fuel pressure that is lower than the first high fuel pressure. With the fuel pressure brought to the first high fuel pressure, the alcohol concentration of the blended fuel injected from the fuel injector can be effectively reduced. With the fuel pressure brought to the second high fuel pressure, in contrast, fuel economy can be improved as compared with the case in which the fuel pressure is brought to the first high fuel pressure. According to the present invention, the fuel pressure is brought to the first high fuel pressure during the cold starting in which reduction in the alcohol concentration is given priority, and to the second high fuel pressure during a period of time until the desorption request is issued after starting, in which fuel economy is given priority. According to the present invention, therefore, aggravation of emissions can be inhibited and fuel economy can be improved at a higher level.

In the sixth aspect of the present invention, the second high fuel pressure is set to a value near the first high fuel pressure. According to the present invention, therefore, a situation can be effectively avoided in which a large amount of alcohol adsorbed on the adsorbent is desorbed before the desorption request is issued.

MODE FOR CARRYING OUT THE INVENTION

Embodiments of the present invention will be described below with reference to the accompanying drawings. In each of the drawings, like or equal elements are identified by the same reference numerals and descriptions therefor will not to be duplicated. The embodiments to be described hereunder are not intended to limit the present invention.

First Embodiment

Arrangements of the First Embodiment

Figure 1:
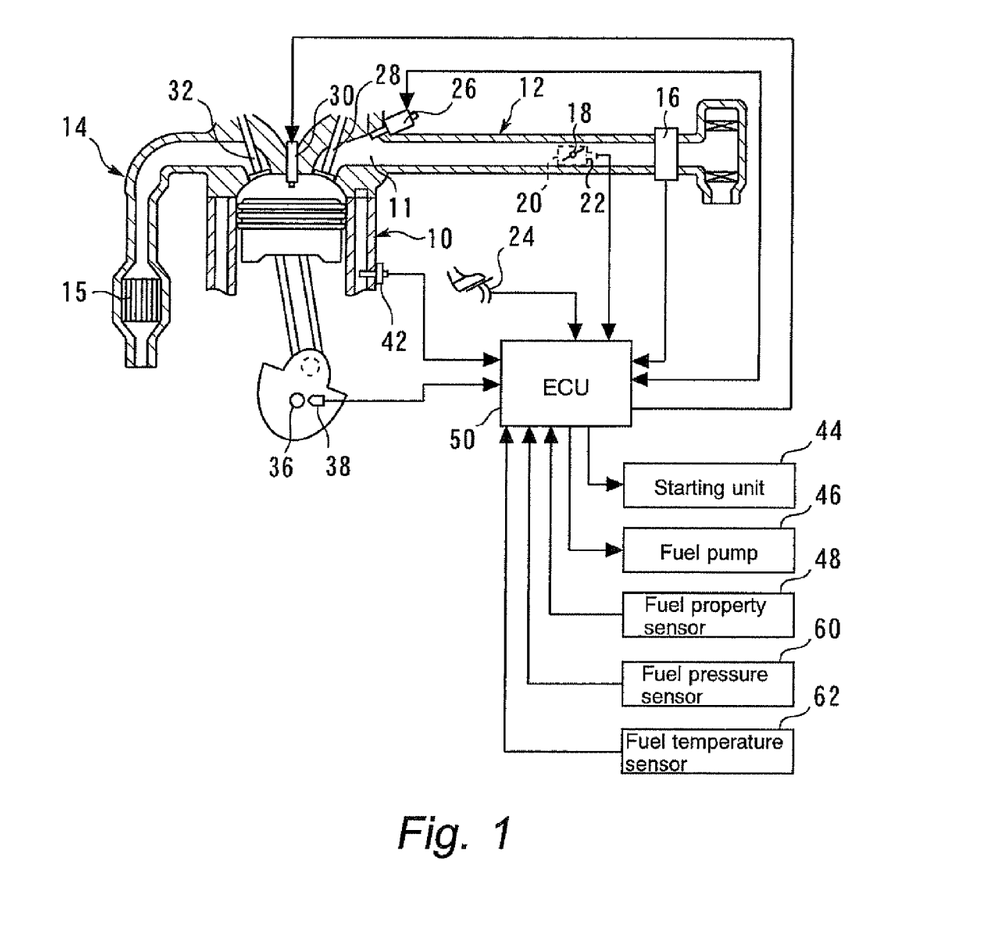
FIG. 1 is a diagram for illustrating a system configuration of a first embodiment of the present invention.

FIG. 1 is a diagram for illustrating a system configuration of a first embodiment of the present invention. Referring to FIG. 1, the system according to this embodiment includes an internal combustion engine 10. The internal combustion engine 10 is used, for example, as a driving power source for a vehicle. The internal combustion engine 10 of this embodiment is an in-line four-cylinder type; however, the number and arrangement of cylinders of the internal combustion engine according to this embodiment are not specifically limited. FIG. 1 is a cross-sectional view of a single cylinder of the internal combustion engine 10.

The internal combustion engine 10 is operable on not only gasoline, but also a fuel that is a mixture composed of gasoline and ethanol, methanol, or other type of alcohol (hereinafter referred to also as an "alcohol-blended fuel" or a "blended fuel"). In this case, the alcohol-blended fuel may range from one having a low concentration (e.g. about several percent) of an alcohol component (ratio of the alcohol component) to one having a high concentration (e.g. 80% or more).

The internal combustion engine 10 is connected with an intake path 12 and an exhaust path 14. An air flow meter 16 for detecting an intake air amount is disposed on the intake path 12. A throttle valve 18 is disposed downstream of the air flow meter 16. The throttle valve 18 has an opening adjusted by operation of a throttle motor 20. A throttle position sensor 22 for detecting the opening of the throttle valve 18 is disposed near the throttle valve 18. A catalyst 15 for purifying an exhaust gas is disposed on the exhaust path 14.

A fuel injector 26 for injecting fuel into an intake port 11 is disposed at each cylinder of the internal combustion engine 10. In addition, an intake valve 28, an ignition plug 30, and an exhaust valve 32 are disposed on each cylinder of the internal combustion engine 10.

A crank angle sensor 38 capable of detecting a rotational angle of a crankshaft 36 (crank angle) is disposed near the crankshaft 36 of the internal combustion engine 10. The crank angle sensor 38 can detect the crank angle and a speed of the internal combustion engine 10.

The system of this embodiment generally includes an accelerator position sensor 24, a coolant temperature sensor 42, a starting unit 44, a fuel pump 46, a fuel property sensor 48, a fuel pressure sensor 60, a fuel temperature sensor 62, and an ECU (electronic control unit) 50. Specifically, the accelerator position sensor 24 detects an amount of depression of an accelerator pedal on a driver's seat side of the vehicle on which the internal combustion engine 10 is mounted. The coolant temperature sensor 42 detects a coolant temperature of the internal combustion engine 10. The starting unit 44 includes a motor for rotatably driving the crankshaft 36 at starting of the internal combustion engine 10. Sensors and actuators of various types including the above are electrically connected to the ECU 50.

Figure 2:
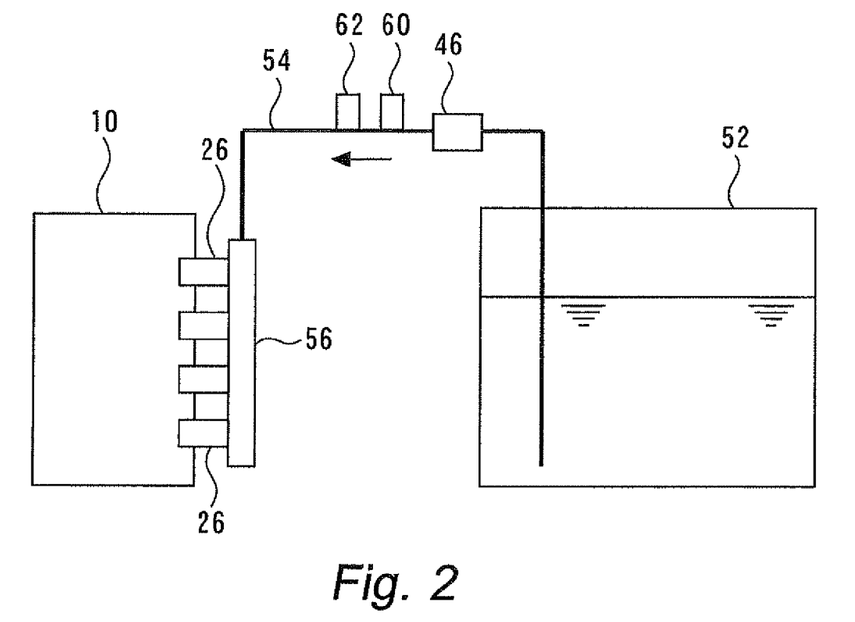
FIG. 2 is an illustration showing schematically a fuel system that supplies the internal combustion engine with fuel.

FIG. 2 is an illustration showing schematically a fuel system that supplies the internal combustion engine 10 with fuel. Referring to FIG. 2, the system of this embodiment includes a fuel tank 52. The fuel tank 52 is connected to a delivery pipe 56 via a fuel supply path 54. The fuel pump 46 that pressurizes fuel is disposed midway in the fuel supply path 54. This is, however, not the only possible location at which to dispose the fuel pump 46; rather, the fuel pump 46 may be disposed, for example, inside the fuel tank 52. The fuel pressure sensor 60 for detecting pressure of the fuel and the fuel temperature sensor 62 for detecting the temperature of the fuel are disposed downstream of the fuel pump 46.

Fuel accumulated in the fuel tank 52 is pressurized by the fuel pump 46 and sent to the delivery pipe 56 through the fuel supply path 54. The delivery pipe 56 distributes fuel to the fuel injector 26 of each cylinder. The fuel pump 46 is adapted to be able to send fuel to the delivery pipe 56 by regulating a fuel pressure to a value commanded by the ECU 50. Specifically, in the system of this embodiment, the fuel pressure inside the fuel injector 26 (specifically, a fuel injection pressure) is adjustable with the fuel pump 46.

Concentration of alcohol in fuel to be supplied to the fuel injector 26, specifically, fuel accumulated in the fuel tank 52 (hereinafter referred to as "in-tank fuel") increases or decreases according to the alcohol concentration of fuel selected for refueling by a user. In this embodiment, the alcohol concentration of the in-tank fuel can be detected by the fuel property sensor 48 disposed midway in the fuel supply path 54. For the fuel property sensor 48, a type of sensor may be used that detects the alcohol concentration by, for example, measuring dielectric constant or refractive index of the fuel. The position at which the fuel property sensor 48 is disposed in the figure is not the only possible arrangement. For example, the fuel property sensor 48 may be disposed in the fuel tank 52 or on the delivery pipe 56. Further, in the present invention, the method for detecting the alcohol concentration of the in-tank fuel is not limited to one using the fuel property sensor 48. For example, the alcohol concentration of the fuel may be detected (estimated) from a learned value in an air-fuel ratio feedback control. Specifically, the gasoline and the alcohol have different stoichiometric air-fuel ratio values, so that the stoichiometric air-fuel ratio value of the alcohol-blended fuel varies depending on the alcohol concentration. This allows the alcohol concentration of the in-tank fuel to be detected (estimated) based on the stoichiometric air-fuel ratio value learned using a signal fed back from an air-fuel ratio sensor (not shown) disposed in the exhaust path 14.

Figure 3:
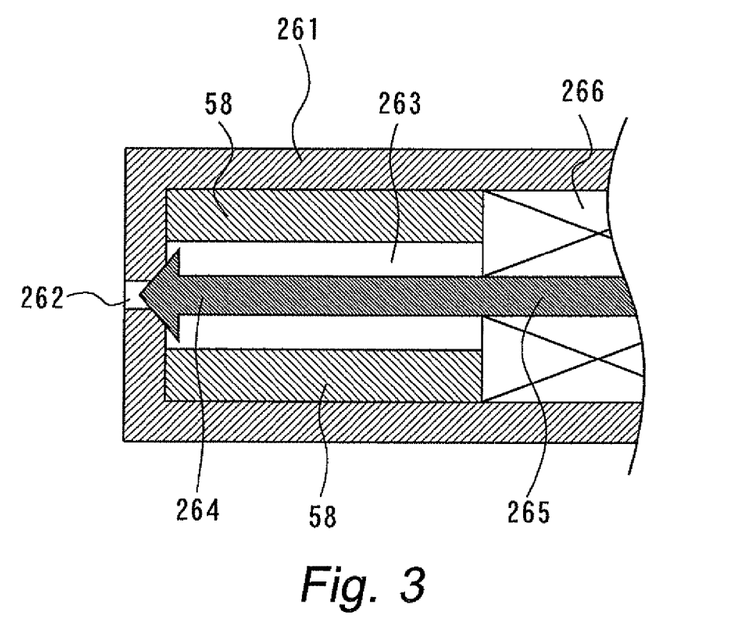
FIG. 3 is an enlarged cross-sectional view showing a leading end portion of the fuel injector.

FIG. 3 is an enlarged cross-sectional view showing a leading end portion of the fuel injector 26 included in the internal combustion engine 10 of this embodiment. Referring to FIG. 3, the fuel injector 26 has a leading end portion 261. The leading end portion 261 includes an Injection port 262 for injecting fuel and an internal space 263 in which fuel is accumulated (filled with fuel). A needle valve 264 as an injection valve is passed through the internal space 263. The needle valve 264 opens and closes the injection port 262. A plunger 265 is integrally formed on a proximal end side of the needle valve 264. A solenoid coil 266 is disposed around the plunger 265. When the solenoid coil 266 is energized, the plunger 265 is pulled in the solenoid coil 266, so that the plunger 265 and the needle valve 264 move to the proximal end side, which opens the injection port 262. This allows fuel in the internal space 263 to be injected from the injection port 262. When the solenoid coil 266 is de-energized, the plunger 265 and the needle valve 264 are brought back to their original positions by an urging force of a spring not shown. This closes the injection port 262 to stop injection. Such a fuel pressure in the internal space 263 of the fuel injector 26 (hereinafter referred to also simply as the "fuel pressure") can be controlled to vary from low to high by a command issued from the ECU 50 to the fuel pump 56 as described earlier.

An adsorbent 58 is disposed in the internal space 263 at the leading end portion 261 of the fuel injector 26. According to the arrangement shown in the figure, the adsorbent 58 is disposed in a tubular form along an inner periphery of the internal space 263. Specifically, the adsorbent 58 is disposed so as to surround an outer peripheral side of the needle valve 264. A type having a property of selectively adsorbing the alcohol component in the alcohol-blended fuel is selected as the adsorbent 58. As a component material of such an adsorbent 58, a highly hydrophilic, porous body having fine pores on a molecule level that can take in alcohol molecules may be used; typically, zeolite is preferably used. Particularly preferably, a type of zeolite having a strong polarity is used. Use of the zeolite having the strong polarity allows alcohol molecules having a strong polarity to be reliably and selectively adsorbed from the fuel containing the gasoline component. Note also that, for example, pore size varies depending on a skeletal structure of the porous body used for the adsorbent 58 (for example, type A, type Y, and type X for zeolite). By selecting an optimum skeletal structure according to the size of the alcohol molecule in question, therefore, a favorable alcohol adsorption property can be obtained. To adsorb ethanol, for example, type A zeolite can be particularly preferably used.

Operations in the First Embodiment (Adsorption and Desorption of Alcohol in the Adsorbent)

The adsorbent 58 has a property that the amount of alcohol adsorbed onto the adsorbent 58 (hereinafter referred to as an "adsorbed amount of alcohol") is small when an ambient fuel pressure is low and the adsorbed amount of alcohol is large when the fuel pressure is high. The embodiment utilizes this property to control the adsorbed amount of alcohol on the adsorbent 58, thereby allowing the alcohol concentration of the fuel injected from the fuel injector 26 to be lower than that of the fuel supplied thereto (specifically, the in-tank fuel). Specifically, when the fuel pressure is increased from a low pressure state in which the adsorbed amount of alcohol is small to a high pressure state in which the adsorbed amount of alcohol is large, the alcohol component of the blended fuel resident in the internal space 263 is selectively adsorbed onto the adsorbent 58. This results in a decreased alcohol concentration of the blended fuel resident in the internal space 263, and an increased gasoline concentration thereof. By increasing the fuel pressure and injecting fuel from the fuel injector 26, therefore, the alcohol concentration of the fuel injected from the fuel injector 26 can be made lower than the alcohol concentration of the in-tank fuel.

Figure 4:
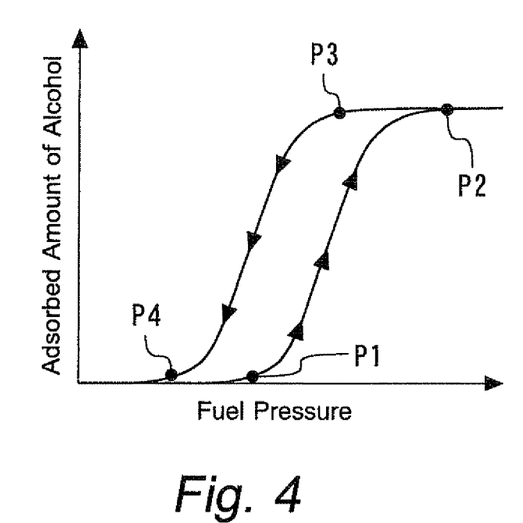
FIG. 4 is a graph showing a relationship between the fuel pressure and the adsorbed amount of alcohol on the adsorbent.

FIG. 4 is a graph showing a relationship between the fuel pressure and the adsorbed amount of alcohol on the adsorbent 58. As described earlier, the adsorbed amount of alcohol is small when the fuel pressure is low and large when the fuel pressure is high. Additionally, the adsorbed amount of alcohol has a hysteresis relative to a history of the fuel pressure as indicated by arrows affixed to curves in FIG. 4. Specifically, the curve on the right in FIG. 4 represents changes in the adsorbed amount of alcohol in a process of the adsorbent 58 adsorbing the alcohol when the fuel pressure is increased from a low pressure to a high pressure. The curve on the left in FIG. 4 represents changes in the adsorbed amount of alcohol in a process of the adsorbent 58 desorbing the adsorbed alcohol when the fuel pressure is decreased from a high pressure to a low pressure.

The ECU 50 can control adsorption of alcohol onto, or desorption of alcohol from, the adsorbent 58 by changing over a value of a set pressure of the fuel pump 46 between a low pressure and a high pressure to thereby vary the fuel pressure in the internal space 263 of the fuel injector 26. The adsorbed amount of alcohol onto the adsorbent 58 is saturated when the fuel pressure rises up to P2 in FIG. 4. Consequently, the fuel pressure is preferably set to more than P2 when the alcohol is to be adsorbed by the adsorbent 58. This allows an alcohol adsorption ability of the adsorbent 58 to be fully extracted. Note, however, that alcohol can be adsorbed onto the adsorbent 58 with a fuel pressure of P1 or more in FIG. 4. To let alcohol be adsorbed onto the adsorbent 58, therefore, the fuel pressure has only to be increased to a value higher than at least P1.

When the fuel pressure is decreased from a condition in which the adsorbed amount of alcohol onto the adsorbent 58 is saturated, substantially no amount of alcohol is desorbed from the adsorbent 58 with a pressure of up to P3 in FIG. 4. When the fuel pressure is lower than P3, desorption of alcohol from the adsorbent 58 is quickly started and, when the pressure is decreased to P4 in FIG. 4, the adsorbed amount of alcohol is substantially zero. To desorb alcohol from the adsorbent 58, therefore, the fuel pressure is preferably set to a value of P4 or lower. This allows a substantially whole amount of alcohol adsorbed onto the adsorbent 58 to be desorbed therefrom. Note, however, that the desorption of alcohol starts with a fuel pressure of P3 in FIG. 4 as described above. To let alcohol be desorbed from the adsorbent 58, therefore, the fuel pressure has only to be decreased down to a value less than at least P3.

(Alcohol Concentration Reduction Control During Cold Starting)

Figure 5:
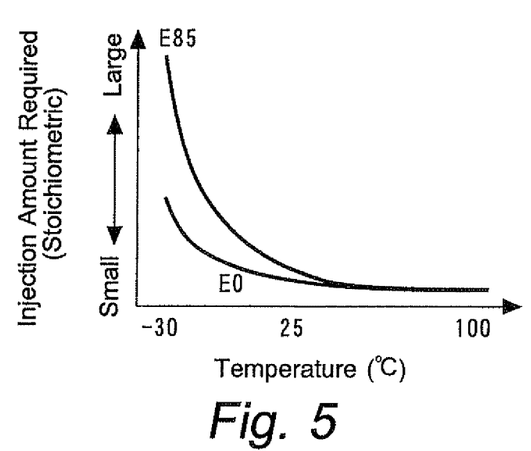
FIG. 5 is a graph showing a relationship between a fuel injection amount required and a temperature of E85 and E0.

An alcohol concentration reduction control during cold starting of the internal combustion engine 10 will be described below with reference to FIG. 5. FIG. 5 is a graph showing a relationship between a fuel injection amount required and a temperature of E85 (a blended fuel with 85% ethanol) and E0 (100% gasoline). As described earlier, a blended fuel having a high concentration of alcohol, such as E85, is extremely difficult to vaporize at lower temperatures. During cold starting of the internal combustion engine, the starting relies only on the gasoline component of the blended fuel injected, so that a large amount of fuel needs to be injected at starting. An amount of alcohol component many times the amount of gasoline component that has contributed to combustion fails to vaporize and burn, flowing past a combustion chamber into an exhaust path in a form of HC. This results in a problem in which the amount of HC discharged into the atmosphere tends to be extremely large during cold starting.

In this embodiment, therefore, control is performed by using the abovementioned function so that, during the cold starting of the internal combustion engine 10, the alcohol concentration of the fuel injected from the fuel injector 26 is lower than the alcohol concentration of the in-tank fuel. This allows fuel with a lower alcohol concentration and a higher gasoline concentration than the in-tank fuel (hereinafter referred to as an "alcohol concentration reduced fuel") to be injected from the fuel injector 26 during the cold starting, even if the alcohol concentration of the in-tank fuel is high. Startability with good combustion can therefore be obtained and a sufficient amount of HC emissions into the atmosphere can be reduced.

In this apparatus in particular, the alcohol concentration reduced fuel can be generated in the internal space 263 disposed immediately before the injection port 262, which allows the alcohol concentration reduced fuel to be injected in the first injection sequence onward during starting. By contrast, in an arrangement in which the alcohol concentration reduced fuel is generated at a position before the fuel injector 26 (for example, the delivery pipe 56), the alcohol concentration reduced fuel can be injected only after the fuel injection sequence is repeatedly performed at least to replace the fuel in the adsorbed amount of alcohol in the fuel injector 26 with the alcohol concentration reduced fuel.

Being able to inject the alcohol concentration reduced fuel in the first injection sequence onward during starting is extremely effective in reducing the amount of HC emissions into the atmosphere for the following reasons. In the beginnings of cold starting, the catalyst 15 is yet to be warmed by the exhaust gas and remains inactive. As a result, most of HC discharged from the internal combustion engine 10 is discharged into the atmosphere without being purified. When combustion thereafter starts in the internal combustion engine 10, the exhaust gas starts flowing into the catalyst 15 to thereby warm the catalyst 15, so that the catalyst 15 starts exhibiting catalytic activity, resulting in HC being purified by the catalyst 15. In order to reduce the amount of HC emissions into the atmosphere during cold starting, therefore, it is extremely important to reduce the amount of HC discharged from the internal combustion engine 10 for the first several cycles during which the catalyst 15 is yet to be warmed. In this respect, this apparatus can inject the alcohol concentration reduced fuel starting with the first injection sequence during starting, so that the amount of alcohol component flowing to the exhaust path 14 without being burned can be reliably reduced. Thus, the amount of HC emissions into the atmosphere during cold starting can be effectively reduced.

When the adsorbed amount of alcohol on the adsorbent 58 is saturated, the adsorbent 58 becomes no longer adsorb alcohol. As a result, the alcohol concentration of fuel Injected is brought back to the original level, specifically, the alcohol concentration of the in-tank fuel, through the process of repeated fuel injection sequences performed from the fuel injector 26 after the internal combustion engine 10 has been started. However, the catalyst 15 is warmed enough during the process to exhibit the activity, which starts purification of HC with the catalyst 15. Discharge of HC into the atmosphere can therefore be sufficiently inhibited. Meanwhile, the internal combustion engine 10 is also warmed during a period through which the alcohol concentration of fuel injected from the fuel injector 26 returns to the original level, which promotes vaporization of the alcohol component. Aggravation of driving stability of the internal combustion engine 10 after starting can therefore be sufficiently inhibited.

Characteristic Operations of the First Embodiment

As described earlier, when the alcohol concentration reduction control is performed during the cold starting of the internal combustion engine 10, alcohol is adsorbed onto the adsorbent 58. Preferably, therefore, the adsorbed alcohol is desorbed during operation of the internal combustion engine 10 in preparation for the subsequent cold starting. Thus, in this embodiment, a control is performed for desorbing the adsorbed alcohol after the internal combustion engine 10 is warmed up. Specifically, the fuel pressure is brought to a predetermined low pressure value. As described earlier, lowering the fuel pressure causes the alcohol adsorbed onto the adsorbent 58 to be desorbed. The desorbed alcohol is injected, together with the blended fuel in the internal space 263, from the fuel injector 26.

It is to be noted that, in the apparatus of this embodiment, the fuel injection amount is determined on the assumption that the in-tank fuel, as is, is injected from the fuel injector 26. A blended fuel containing the desorbed alcohol (hereinafter referred to as a "desorbed alcohol-contained fuel"), however, has an alcohol concentration higher than that of the in-tank fuel. This results in a deviation occurring in the air-fuel ratio of the internal combustion engine 10 for a period of time during which the desorbed alcohol-contained fuel is injected from the fuel injector 26.

In this embodiment, therefore, an air-fuel ratio correction control is to be performed when the desorbed alcohol-contained fuel is injected. More specifically, the concentration of the desorbed alcohol-contained fuel to be injected from the fuel injector 26 is estimated and, depending on the concentration, the injection amount is increased or decreased such that the air-fuel ratio of the internal combustion engine 10 is a control target air-fuel ratio. This allows aggravation of HC emissions as a result of discharging unburned alcohol to be effectively inhibited.

Specific Process Performed in the First Embodiment

Figure 6:
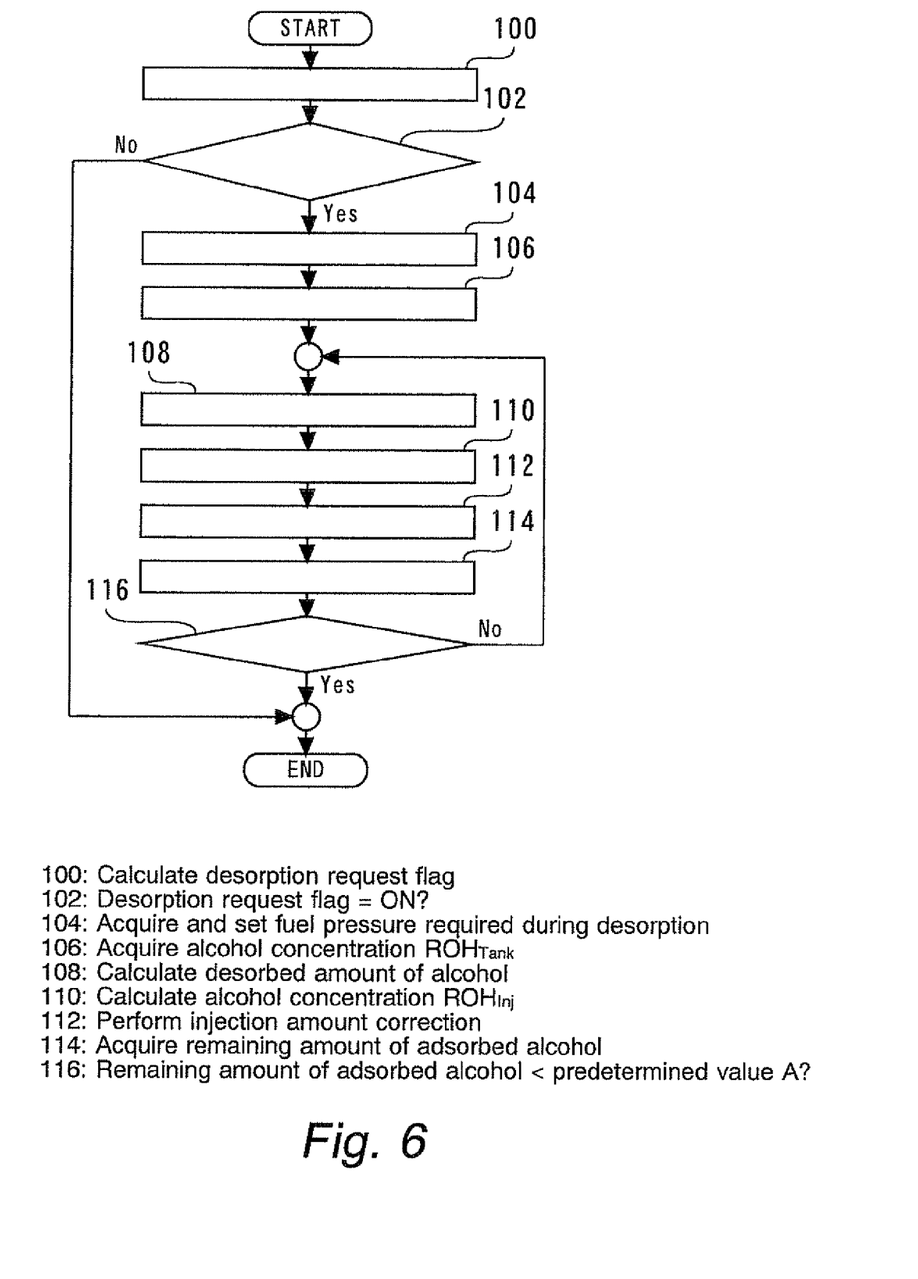
FIG. 6 is a flow chart showing a routine that is executed in accordance with a first embodiment of the present invention.

Specific process performed in this embodiment will be described below with reference to FIG. 6. FIG. 6 is a flow chart showing a routine performed by the ECU 50 in this embodiment for achieving the above-described air-fuel ratio correction. The routine shown in FIG. 6 is to be repeatedly performed for a period of time during which the alcohol concentration reduction control at the cold starting is performed, specifically, during which the fuel pressure is set to a high fuel pressure. Referring to the routine shown in FIG. 6, a desorption request flag is first calculated (step 100). The desorption request flag is turned ON if there is a request for desorbing alcohol adsorbed onto the adsorbent 58 and, specifically, is calculated based on, for example, whether or not the coolant temperature is higher than a predetermined value or whether or not there is a requirement for making the fuel pressure a low pressure value.

Next, it is determined whether or not the desorption request flag is ON (step 102). If, as a result, it is determined that the desorption request flag is OFF, this routine is immediately terminated. If it is determined in step 102 that the desorption request flag is ON, the operation proceeds to the next step in which a fuel pressure required during desorption is acquired and set (step 104). Specifically, the fuel pressure required during desorption is set to a low fuel pressure (hereinafter referred to as a "low fuel pressure") that allows most of alcohol adsorbed onto the adsorbent 58 to be desorbed.

Next, an alcohol concentration $ROH_{Tank}$ of the in-tank fuel is acquired (step 106). Specifically, the alcohol concentration of the in-tank fuel detected by the fuel property sensor 48 is here acquired.

Next, an amount of alcohol desorbed from the adsorbent 58 is calculated based on a volume of the internal space 263, the fuel temperature, and the fuel pressure (step 108). The ECU 50 stores in memory a map that specifies relationships among the alcohol desorbed amount, the volume of the internal space 263, the fuel temperature, and the fuel pressure. Specifically, by using such a map, an alcohol desorbed amount that corresponds to a current condition of the internal space 263 is estimated.

Next, an alcohol concentration $ROH_{Inj}$ of the injected fuel is calculated (step 110). The ECU 50 stores in memory relationships among $ROH_{Inj}$, $ROH_{Tank}$, and the alcohol desorbed amount. Specifically, such a map is used to calculate an alcohol concentration $ROH_{Inj}$ of the injected fuel that corresponds to the alcohol concentration $ROH_{Tank}$ of the in-tank fuel calculated in step 106 and the alcohol desorbed amount calculated in step 108.

Next, fuel injection process is performed (step 112). Specifically, a corrected injection amount is first calculated that allows the air-fuel ratio of the internal combustion engine 10 to be the control target air-fuel ratio, when fuel with a concentration calculated in step 110 is injected. Then, based on the corrected injection amount, the desorbed alcohol-contained fuel is injected from the fuel injector 26.

Next, an amount of alcohol still adsorbed on the adsorbent 58 (hereinafter referred to as an "remaining amount of adsorbed alcohol") is acquired (step 114). The ECU 50 stores in memory a map that specifies relationships among the remaining amount of adsorbed alcohol, the volume of the internal space 263, the fuel temperature, and the fuel pressure. Specifically, by using such a map, an remaining amount of adsorbed alcohol that corresponds to a current condition of the internal space 263 is acquired.

It is next determined whether or not the remaining amount of adsorbed alcohol is smaller than a predetermined value A. A preset value is read for the predetermined value A as an alcohol adsorbed amount when the fuel pressure is brought to the fuel pressure required during desorption. If, as a result, the remaining amount of adsorbed alcohol <the predetermined value A does not hold, it is then determined that the alcohol is yet to be desorbed and this routine is performed again, starting with step 108 onward. If it is determined in step 116 that the remaining amount of adsorbed alcohol <the predetermined value A holds, it is then determined that desorption of the alcohol is completed and this routine is terminated.

As described heretofore, the apparatus of the first embodiment allows any deviation in the air-fuel ratio occurring as a result of injection of the desorbed alcohol-contained fuel to be effectively corrected when a request is issued to desorb alcohol adsorbed onto the adsorbent 58.

In the first embodiment described above, the fuel pressure and the fuel temperature detected by the fuel pressure sensor 60 and the fuel temperature sensor 62, respectively, are used for estimating the alcohol desorbed amount. Values used for making such an estimate are not, however, limited to those detected values. Specifically, for example, a set fuel pressure may be used in place of the fuel pressure inside the internal space 263 or these state quantities may be estimated by using another well-known technique.

The alcohol concentration $ROH_{Tank}$ in the first embodiment described above corresponds to the "first alcohol concentration" in the first aspect of the present invention. Similarly, performance of step 102 by the ECU 50 achieves the "determining means" in the first aspect of the present invention, performance of step 104 achieves the "control means" in the first aspect of the present invention, performance of step 108 achieves the "desorbed amount estimating means" in the first aspect of the present invention, and performance of step 112 achieves the "correcting means" in the first aspect of the present invention, respectively.

Additionally, the alcohol concentration $ROH_{Inj}$ in the first embodiment described above corresponds to the "second alcohol concentration" in the third aspect of the present invention. Further, performance of step 110 by the ECU 50 achieves the "concentration estimating means" in the third aspect of the present invention.

Second Embodiment

Characteristics of the Second Embodiment

Figure 7:
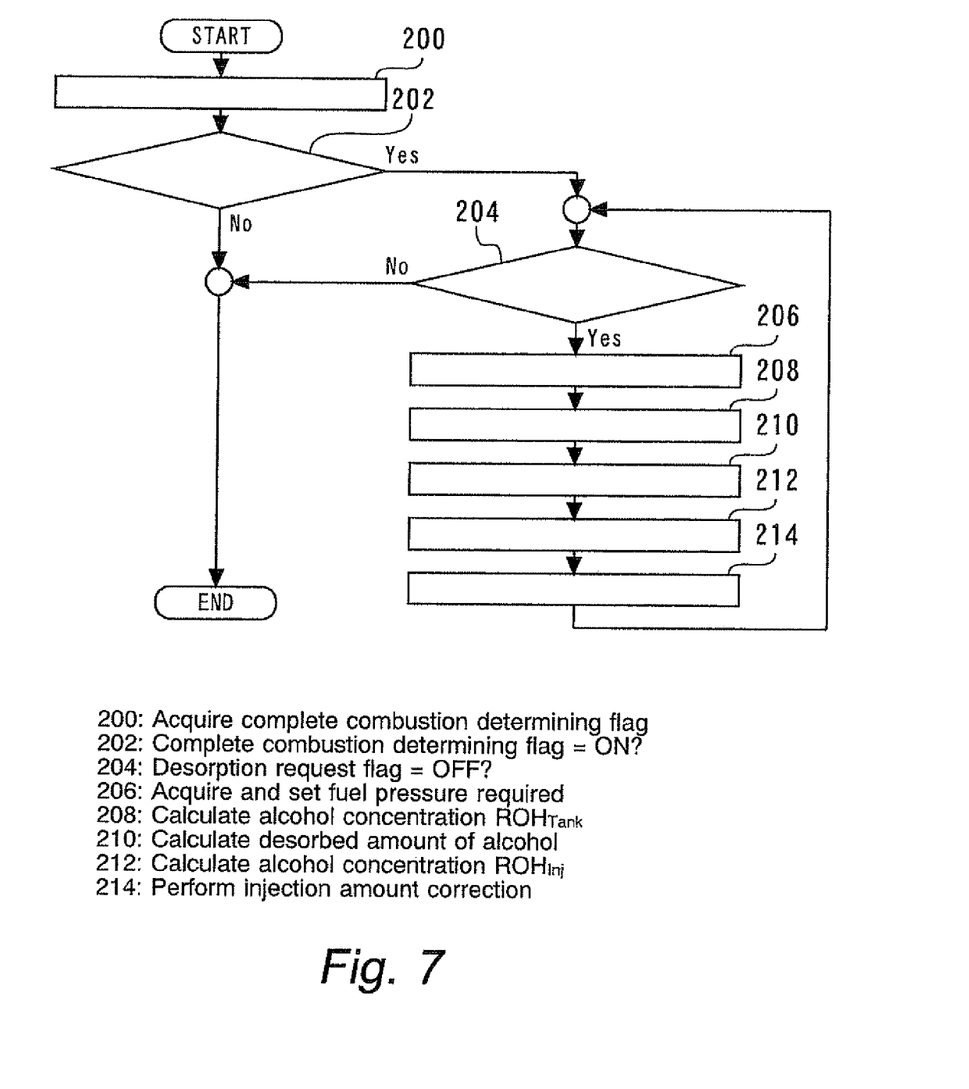
FIG. 7 is a flow chart showing a routine that is executed in accordance with a second embodiment of the present invention.

A second embodiment of the present invention will be described below with reference to FIGS. 4 and 7. A system according to this embodiment can be achieved by letting an ECU 50 perform a routine shown in FIG. 7 to be described later using the hardware configuration shown in FIG. 1.

As described earlier, the adsorbed amount of alcohol onto the adsorbent 58 is saturated when the fuel pressure rises up to P2 in FIG. 4. Consequently, the fuel pressure is preferably set to P2 or more during the cold starting of the internal combustion engine 10. This allows an alcohol adsorption ability of the adsorbent 58 to be fully extracted. When the fuel pressure is decreased from the condition in which the adsorbed amount of alcohol onto the adsorbent 58 is saturated, in contrast, the adsorbed amount of alcohol is substantially zero at P4 in FIG. 4. When a request is issued to desorb the alcohol, therefore, the fuel pressure is preferably set to P4 or less. This allows substantially all of the alcohol adsorbed onto the adsorbent 58 to be desorbed.

When the adsorption or desorption control as described above is performed, the fuel pressure is brought to P2 or higher during a period of time until the alcohol desorption request is issued after the cold starting. Keeping the fuel pressure at a high pressure for a long time, however, invites aggravation of fuel economy due to an increased power consumption. When the fuel pressure is decreased from the condition in which the adsorbed amount of alcohol onto the adsorbent 58 is saturated, substantially no alcohol is desorbed from the adsorbent 58 up to P3 in FIG. 4. This is because the adsorbed amount of alcohol has a hysteresis relative to a history of the fuel pressure as indicated by arrows affixed to curves in FIG. 4.

In the second embodiment, therefore, for the period of time until the desorption request is issued after the starting of the internal combustion engine, the fuel pressure is set to a value near P3 in FIG. 4, specifically, a value lower than the fuel pressure during cold starting and that before the alcohol adsorbed amount rapidly decreases. Power consumption can thereby be held low, while the alcohol adsorbed amount is inhibited from decreasing as much as possible.

Specific Process Performed in the Second Embodiment

Specific process performed in this embodiment will be described below with reference to FIG. 7. FIG. 7 is a flow chart showing a routine performed by the ECU 50 in this embodiment for achieving the above-described function. The routine shown in FIG. 7 is to be repeatedly performed for the period of time during which the alcohol concentration reduction control at the cold starting is performed, specifically, during which the fuel pressure is set to a high fuel pressure (P2 of FIG. 4). In the routine shown in FIG. 7, a complete combustion determining flag is acquired first (step 200). The complete combustion determining flag is turned ON when the internal combustion engine 10 enters a stable combustion state following starting. Specifically, the complete combustion determining flag is calculated based on, for example, whether or not the internal combustion engine 10 has started and the coolant temperature is greater than a predetermined value.

Next, it is determined whether or not the complete combustion determining flag is ON (step 202). If it is determined, as a result, that the complete combustion determining flag is OFF, this routine is immediately terminated. If it is determined in step 202 that the complete combustion determining flag is ON, then the operation proceeds to the next step in which it is determined whether or not the desorption request flag calculated in step 100 is OFF (step 204). If it is determined, as a result, that the desorption request flag is ON, this routine is immediately terminated. If it is determined in step 204 that the desorption request flag is OFF, in contrast, the operation proceeds to the next step in which the fuel pressure required is acquired and set (step 206). Specifically, the fuel pressure required is set to P3 in FIG. 4.

Next, the alcohol concentration $ROH_{Tank}$ of the in-tank fuel is acquired (step 208). Next, the amount of alcohol desorbed from the adsorbent 58 is calculated (step 210). Next, the alcohol concentration $ROH_{Inj}$ of the injected fuel is calculated (step 212). Then, the fuel injection process is performed (step 214). Specifically, the same process as that in steps 106 to 112 is here performed. When step 214 is performed, the operation proceeds to step 204. The process of steps 204 to 214 is repeatedly performed until the desorption request flag is ON.

As described heretofore, in the apparatus of the second embodiment, the fuel pressure is set to a level lower than that in the cold starting for the period of time until the alcohol desorption request is issued after the complete combustion of the internal combustion engine 10. This improves fuel economy through power consumption that is kept low, while inhibiting as much as possible the alcohol adsorbed amount from decreasing.

In the second embodiment described above, the fuel pressure required following the complete combustion is set to P3 in FIG. 4. The fuel pressure to be set is not, however, limited to such a value. Specifically, the fuel pressure may be set to another value as long as such another value is lower than the fuel pressure during cold starting and is before the adsorbed amount suddenly decreases.

In the second embodiment described above, the fuel pressure P2 corresponds to the "high fuel pressure" in the fifth aspect of the present invention, the fuel pressure P3 corresponds to the "second high fuel pressure" in the fifth aspect of the present invention, and the fuel pressure P4 corresponds to the "low fuel pressure" in the fifth aspect of the present invention, respectively. Similarly, performance of step 208 by the ECU 50 achieves the "means for achieving the second high fuel pressure" in the fifth aspect of the present invention.

DESCRIPTION OF REFERENCE CHARACTERS 10 internal combustion engine
11 intake port
12 intake path
14 exhaust path
15 catalyst
16 air flow meter
18 throttle valve
24 accelerator position sensor
26 fuel injector
261 leading end portion
262 injection nozzle
263 internal space
264 needle valve
265 plunger
266 solenoid coil
28 intake valve
30 ignition plug
32 exhaust valve
42 coolant temperature sensor
50 ECU
52 fuel tank
54 fuel supply path
56 delivery pipe
58 adsorbent
60 fuel pressure sensor
62 fuel temperature sensor

The invention claimed is:

1. A fuel injection apparatus for an internal combustion engine including: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the fuel injection apparatus controlling an injection amount from the fuel injector such that an air-fuel ratio of the internal combustion engine is a control target air-fuel ratio based on an alcohol concentration of the blended fuel to be supplied to the fuel injector, the adsorbent having a characteristic that an adsorbed amount of alcohol is small when a fuel pressure is low and large when the fuel pressure is high, the fuel injection apparatus comprising:

means for determining whether or not there is a request for desorbing alcohol adsorbed onto the adsorbent;
means for bringing the fuel pressure to a predetermined low fuel pressure if it is determined that there is the request;
means for estimating an amount of alcohol to be desorbed from the adsorbent; and
means for correcting any deviation in an air-fuel ratio of the internal combustion engine based on the desorbed amount of alcohol.

2. The fuel injection apparatus for the internal combustion engine according to claim 1, wherein:

the desorbed amount estimating means estimates the desorbed amount of alcohol based on a fuel pressure and a fuel temperature inside the internal space.

3. The fuel injection apparatus for the internal combustion engine according to claim 1, wherein:

the correcting means includes means for estimating an alcohol concentration of fuel to be injected from the fuel injector based on the desorbed amount of alcohol, and corrects a change in the air-fuel ratio corresponding to an increase in the second alcohol concentration relative to the first alcohol concentration by increasing or decreasing the injection amount.

4. The fuel injection apparatus for the internal combustion engine according to claim 1, wherein:

the determining means includes means for acquiring a coolant temperature of the internal combustion engine and determines that there is the request when the coolant temperature is lower than a predetermined value.

5. The fuel injection apparatus for the internal combustion engine according to claim 1, further comprising:

means for bringing the fuel pressure to a first high fuel pressure during cold starting of the internal combustion engine; and
means for bringing the fuel pressure to a second high fuel pressure that is lower than the first high fuel pressure and higher than the low fuel pressure if it is determined that there is not the request immediately after starting of the internal combustion engine.

6. The fuel injection apparatus for the internal combustion engine according to claim 5, wherein:

the second high fuel pressure is a value near the first high fuel pressure.

7. A fuel injection apparatus for an internal combustion engine including: a fuel injector having a leading end portion that has an internal space in which fuel is accumulated and an injection port for injecting fuel; and an adsorbent disposed in the internal space, the adsorbent being capable of selectively adsorbing an alcohol component in a blended fuel of gasoline and alcohol, the fuel injection apparatus controlling an injection amount from the fuel injector such that an air-fuel ratio of the internal combustion engine is a control target air-fuel ratio based on an alcohol concentration of the blended fuel to be supplied to the fuel injector, the adsorbent having a characteristic that an adsorbed amount of alcohol is small when a fuel pressure is low and large when the fuel pressure is high, the fuel injection apparatus comprising:
- a device for determining whether or not there is a request for desorbing alcohol adsorbed onto the adsorbent;
- a device for bringing the fuel pressure to a predetermined low fuel pressure if it is determined that there is the request;
- a device for estimating an amount of alcohol to be desorbed from the adsorbent; and
- a device for correcting any deviation in an air-fuel ratio of the internal combustion engine based on the desorbed amount of alcohol.

* * * * *